(12) United States Patent
Box et al.

(10) Patent No.: US 7,052,047 B1
(45) Date of Patent: May 30, 2006

(54) DETACHABLE HIGH-PRESSURE FLOW PATH COUPLER

(75) Inventors: Charles W. Box, Littleton, CO (US); Frank C. Zegler, Idledale, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/394,427

(22) Filed: Mar. 21, 2003

Related U.S. Application Data

(60) Provisional application No. 60/366,725, filed on Mar. 21, 2002.

(51) Int. Cl.
*F17C 7/02* (2006.01)
*F16L 59/14* (2006.01)

(52) U.S. Cl. .................. 285/123.15; 285/47; 285/904; 62/50.1; 62/50.7

(58) Field of Classification Search .............. 285/47, 285/904, 123.15, 13, 48, 54; 62/50.1, 50.7
See application file for complete search history.

(56) References Cited

U.S. PATENT DOCUMENTS

| | | | | |
|---|---|---|---|---|
| 3,137,143 A | * | 6/1964 | Richards et al. | 62/50.7 |
| 3,316,931 A | * | 5/1967 | Elrod | 137/339 |
| 3,466,886 A | * | 9/1969 | Doose et al. | 62/50.7 |
| 4,011,732 A | * | 3/1977 | Doherty et al. | 62/50.7 |
| 4,108,476 A | * | 8/1978 | Krupp | 285/47 |
| 4,207,745 A | * | 6/1980 | Pouillange | 62/50.7 |
| 4,250,713 A | * | 2/1981 | Germann | 62/50.7 |
| 4,491,347 A | * | 1/1985 | Gustafson | 285/47 |
| 5,582,016 A | | 12/1996 | Gier et al. | |
| 5,901,557 A | | 5/1999 | Grayson | |
| 6,134,893 A | * | 10/2000 | Bonn | 62/50.7 |
| 6,374,618 B1 | | 4/2002 | Lak | |
| 6,394,507 B1 | | 5/2002 | Baker | |

FOREIGN PATENT DOCUMENTS

| | | | |
|---|---|---|---|
| DE | 4031879 A1 | * | 4/1992 |
| DE | 4107652 A1 | * | 9/1992 |
| GB | 1567373 | * | 5/1980 |
| GB | 2166514 A | * | 5/1986 |

* cited by examiner

*Primary Examiner*—James M. Hewitt
(74) *Attorney, Agent, or Firm*—Marsh, Fischmann & Breyfogle LLP

(57) ABSTRACT

A coupler for making a detachable bayonet connection between two sections of a flow path. The coupler includes male and female bayonet hub members that detachably connect the flow path sections. In one aspect of the invention, the coupler includes an internal vapor shielding flow path defined within the coupler by the interconnection of the hub members that operates to intercept and remove heat entering the coupler from the external environment. In this regard, the internal vapor shielding flow path may include at least one valve to vent at least a portion of the vapor shielding material external to the coupler from the vapor shielding flow path.

35 Claims, 5 Drawing Sheets

DETACHABLE HIGH-PRESSURE FLOW PATH COUPLER

RELATED APPLICATION INFORMATION

This application claims priority from U.S. Provisional Patent Application Ser. No. 60/366,725, filed Mar. 21, 2002, and entitled "Bayonet, Cryogenic, High Pressure, Coaxial, With Vapor Shielding," the entire disclosure of which is incorporated herein by reference.

FIELD OF THE INVENTION

The invention is related to the field of apparatuses for connecting high-pressure flow paths, and more particularly, to a detachable bayonet coupler with vapor shielding.

BACKGROUND OF THE INVENTION

Cryogenic materials, such as liquid helium and/or liquid nitrogen, are materials that are gases under normal atmospheric conditions, but that become liquid when pressurized and sufficiently cooled. Transfer systems for cryogenic materials typically include pipes joined together using welded flanges and/or detachable couplers. The pipes are often vacuum jacketed to minimize the amount of heat entering into the system and reaching the transferred material. When detachable couplers are utilized, the coupled joint represents a discontinuity in the vacuum jacket around the pipes, because of the inherent detachability of the coupler. Thus, where a detachable connection between two pipes designed to carry cryogenic material is desired, couplers such as "bayonet" couplers are often utilized to minimize the amount of heat conduction at the joint.

Conventional bayonet couplers are appropriate in systems designed to transport materials maintained in a pressure range of a nominal 150 pounds per square inch ("PSI") to a maximum of 300 PSI. To address heat leakage, conventional bayonet couplers provide an overlapping joint that operates to insulate against heat conduction. The overlapping joint is formed by an elongated annular extension formed on a male hub that is insertable into an aperture of a female hub, such that heat conducted from the atmosphere must travel through the hubs and along the overlap before it is conducted to the flow path. In this regard, the performance of conventional bayonet couplers, in terms of addressing heat conduction, is primarily a function of the thickness and length of the overlapping joint between the male and female hubs, as the structure of the overlap is what conducts the undesirable heat, e.g., the heat enters the hub from the atmosphere and traverses through the hubs and along the overlapping joint where it reaches the connected pipes.

Unfortunately, however, detachable joints, and specifically, the primary means for providing detachable joints in cryogenic systems, e.g., conventional bayonet couplers, are impractical where pressures are above 300 PSI. In such systems, the thickness of the overlapping joint, e.g., the thickness of the male extension and mating female receiver, must be significantly increased to accommodate the additional pressure. Increasing the thickness, however, means that the length of the male extension and female receiver must also be increased several times to accommodate the increased heat conduction provided by the increased thickness. In this regard, conventional bayonet couplers for systems where the pressure is above 300 PSI would have to be so large, e.g., on the order of several feet, that manufacturing becomes impractical both from a cost standpoint and feasibility standpoint. In other words, hollowing out a several foot long piece of raw alloy material stock to form the overlapping portion of a bayonet coupler is not cost effective or practical. Rather in high pressure systems a welded connection with an overlapping vacuum jacket is utilized, albeit without an efficient means for detaching, e.g., cutting of the weld.

Another problem with conventional bayonet couplers utilized in cryogenic systems is leakage of material. Such leakage often occurs during startup and shut down where low temperature material flow contacts the joints formed by the coupler causing expansion and/or contraction of the same that results in leakage.

It is also known in the art of cryogenic fluid storage systems to use vapor shielding as an insulator to prevent heat transfer to a stored or transported fluid. Typically, in such systems, boil off of the cryogenic fluid from the storage system is routed through tubing, e.g., coils or wraps of tubing, to another storage container. The coils or wraps of tubing intercept heat at junctions in contact with the outside atmosphere and reduce the heat transfer from the environment to the stored cryogenic fluid.

SUMMARY OF THE INVENTION

The present invention generally relates to detachable bayonet couplers for connecting flow paths sections. In view of the foregoing, a broad object of the present invention is to provide a detachable coupler that is easy to handle and cost effective to manufacture. Another object of the present invention is to provide a detachable coupler for connecting high-pressure, e.g., in excess of 300 PSI, flow path sections. Another object of the present invention is to provide a detachable coupler with internal vapor shielding capability. Finally, another object of the present invention is to reduce leakage from bayonet couplers utilized to couple high-pressure low temperature material flows.

In relation to a coupler according to the present invention, each of the various aspects discussed in more detail below includes a male and female hub member. The male hub member is connected to a first section of a material flow path and the female hub member is connected to a second section of the material flow path. In this regard, the male hub member includes an elongated extension that mates with an aperture defined in the female hub member to form a bayonet connection therebetween. In the context of the present invention, a bayonet connection is defined as any connection of two members where an elongated portion of one member is inserted into an aperture of the other member during connection to form a connection between the two members.

In accordance with a first aspect of the present invention, a coupler is provided that forms a detachable bayonet connection between two material flow paths. In this characterization, the coupler includes a male bayonet hub member, a female bayonet hub member, and a connector to detachably connect the male and female hub members. In this regard, the male hub member is connected to a first section of a first flow path and a first section of a second flow path. The female hub member is mateable with the male hub member and connected to a second section of the first flow path and a second section of the second flow path such that when the hubs are connected, two flow paths are defined.

Various refinements exist of the features noted in relation to the subject first aspect of the present invention. Further features may also be incorporated into the subject first aspect of the present invention as well. These refinements and additional features may exist individually or in any combination. For instance, one of the first and second flow paths may be a flow path for transporting a high-pressure, e.g., above 300 PSI material, such as a cryogenic material, and the other one of the flow paths may be a flow path for providing vapor shielding for the high-pressure flow path. In this characterization, the coupler may further include a first portion of a vacuum conduit connected to the male hub member and a second portion of a vacuum conduit connected to a female hub member. In another instance, the coupler may include a female adapter member disposed on an end of the first section of the first flow path and the first section of the second flow path and a male adapter member disposed on an end of the second section of the first flow path and the second section of the second flow path. In this regard, the adapter members are mateable to facilitate coupling of the flow path sections when the male and female hub members are connected.

According to a second aspect of the present invention a coupler for connecting a first and second section of a material flow path is provided. According to this characterization, the connection of the male and female hub members defines a vapor shielding flow path within the coupler such that a vapor shielding material may be provided internal to the coupler from a material flow path running through the coupler. In this regard, the material flow path running through the coupler may itself provide vapor shielding functionality for another flow path running through the coupler, as well as provide vapor shielding material to the vapor shielding flow path defined by interconnection of the hub members.

Various refinements exist of the features noted in relation to the subject second aspect of the present invention. Further features may also be incorporated in the subject first aspect of the present invention as well. These refinements and additional features may exist individually or in any combination. For instance, in one embodiment of the coupler, the internal vapor shielding flow path may include an annular space defined by the interconnection of the male extension member and the receiving aperture of the female hub. According to this characterization, the coupler may include at least one valve fluidly connected to the vapor shielding flow path defined by the connected hub members to controllably vent the flow of vapor shielding material external to the coupler. In this regard, a seal may be provided between the connected male and female hub members to seal the vapor shielding flow path. Such venting provides the advantage of generating a constant flow of vapor shielding material through the coupler to intercept and carry heat external to the coupler. Where the coupler is utilized to connect high-pressure low temperature flow path sections e.g., a cryogenic material flow path, the flow of the vapor shielding material within the vapor shielding flow path of the coupler provides the advantage of reducing heat contamination through the coupler.

According to a third aspect of the present invention a method for connecting first and second sections of a first and second flow path of a fluid system is provided. The method includes the steps of connecting a male bayonet hub member to a female bayonet hub member. In this characterization, the male bayonet hub member is coupled to the first section of the first flow path and the first section of the second flow path while the female hub member is coupled to the second section of the first flow path and the second section of the second flow path. In this regard, the method may further include providing a first material flow through the first flow path and a second material flow through a second flow path.

According to a fourth aspect of the present invention a method for connecting first and second sections a material flow path of a fluid system is provided. The method includes the step of coupling the male and female bayonet members, which are in turn respectively connected to the first and second section of the material flow path. In this regard, the method further includes providing vapor shielding material internally to the connected male and female hub members from a flow path running through the connected hub members.

According to a fifth aspect of the present invention a method for connecting first and second sections of a material flow path of a fluid system is provided. The method includes the step of coupling the male and female bayonet members, which are in turn respectively connected to the first and second section of the material flow path. In this regard, the method further includes providing vapor shielding material internally to the connected male and female hub members from a vapor shielding flow path running through the connected hub members and venting the vapor shielding material external to the fluid system.

According to a sixth aspect of the present invention a method for transporting a fluid is provided. The method includes the steps of attaching a first coupling to a first conduit, attaching a second coupling to a second conduit and interconnecting the first and second couplings, wherein the interconnecting step comprises defining first and second flow paths, wherein the first flow path comprises the first and second conduits. The method further includes providing a first flow through the first flow path and directing a portion of the first flow into the second flow path.

According to a seventh aspect of the present invention a fluid system is provided. The fluid system comprises a first conduit including a second conduit disposed about the first conduit and a female connector disposed about the second conduit. The system also includes a third conduit including a fourth conduit disposed about the third conduit and a male connector disposed about the fourth conduit and further disposed within the female connector so as to be separated from an end portion of the second conduit by a first annular space. According to this characterization, the first and third conduits are fluidly connected, the second and fourth conduits are fluidly connected, and the first annular space is fluidly connected with a flow within the second and fourth conduits.

Various refinements exist of the features noted in relation to the subject seventh aspect of the present invention. Further features may also be incorporated in the subject seventh aspect of the present invention as well. These refinements and additional features may exist individually or in any combination. For instance, according to one feature, a flow path through the second conduit is defined by an annular space between the first and second conduits, and a flow path through the fourth conduit is defined by a space between the third and fourth conduits. According to another feature of the subject seventh aspect, the system further comprises a first adapter that includes first and second flow paths and is attached to a first end of each of the first and second conduits. According to this feature the system also includes a second adapter including third and fourth flow paths and that is attached to a first end of each of the third and fourth conduits. According to this characterization, the first flow path is fluidly connected with the first conduit, the second flow path is fluidly connected with a space between the first and the second conduit, the third flow path is fluidly connected with the third conduit, and the fourth flow path is fluidly connected with a space between the third and fourth conduits. Furthermore, the male connector extends from the second adapter and a first portion of the first adapter interfaces with a first portion of the second adapter. Additionally, a second portion of the first adapter having an end of the second flow path is separated from a second portion of the second adapter having an end of the fourth flow path by a second space, wherein the second space intersects with the first annular space.

Additional aspects and advantages of the present invention will be apparent to those skilled in the art upon review of the further description that follows:

DETAILED DESCRIPTION

Reference will now be made to the accompanying drawings, which at least assist in illustrating the various pertinent features of the present invention. In this regard, the following description is presented for purposes of illustration and description and is not intended to limit the invention to the form disclosed herein. Consequently, variations and modifications commensurate with the following teachings, and skill and knowledge of the relevant art, are within the scope of the present invention. The embodiments described herein are further intended to explain the best modes known of practicing the invention and to enable others skilled in the art to utilize the invention in such, or other embodiments and with various modifications required by the particular application(s) or use(s) of the present invention.

Figure 1:
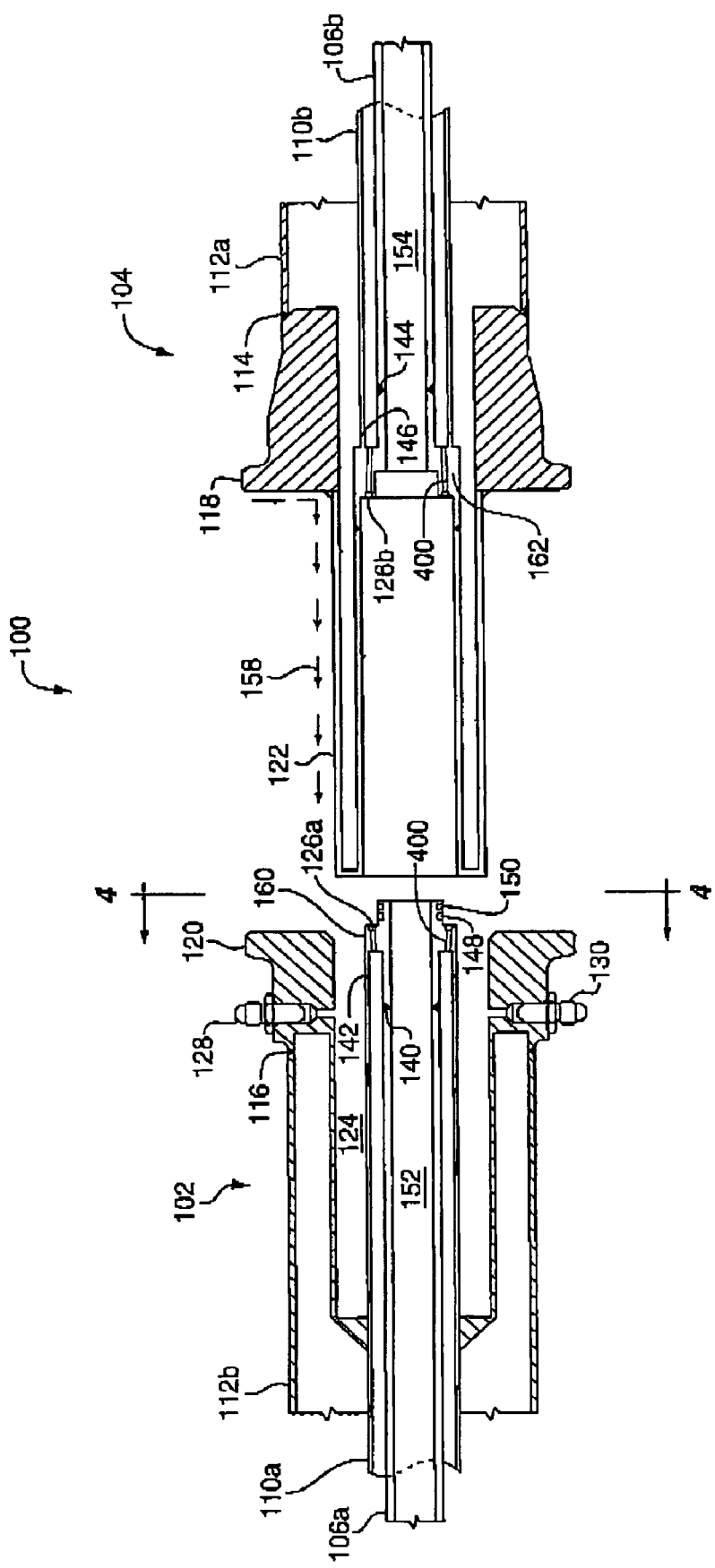
FIG. 1 illustrates an exploded, view of one embodiment of a coupler for connecting flow path sections.
Figure 2:
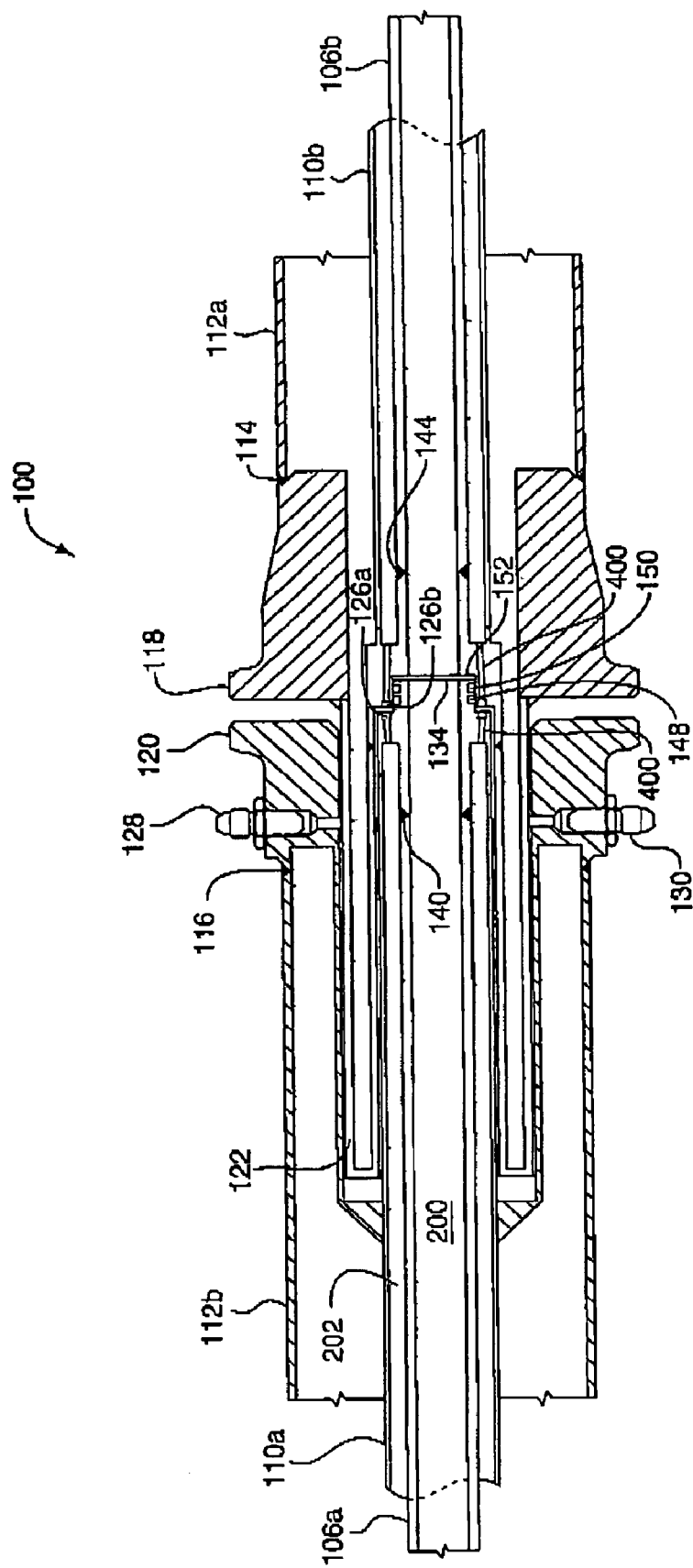
FIG. 2 illustrates an assembled view of the coupler of FIG. 1.
Figure 3:
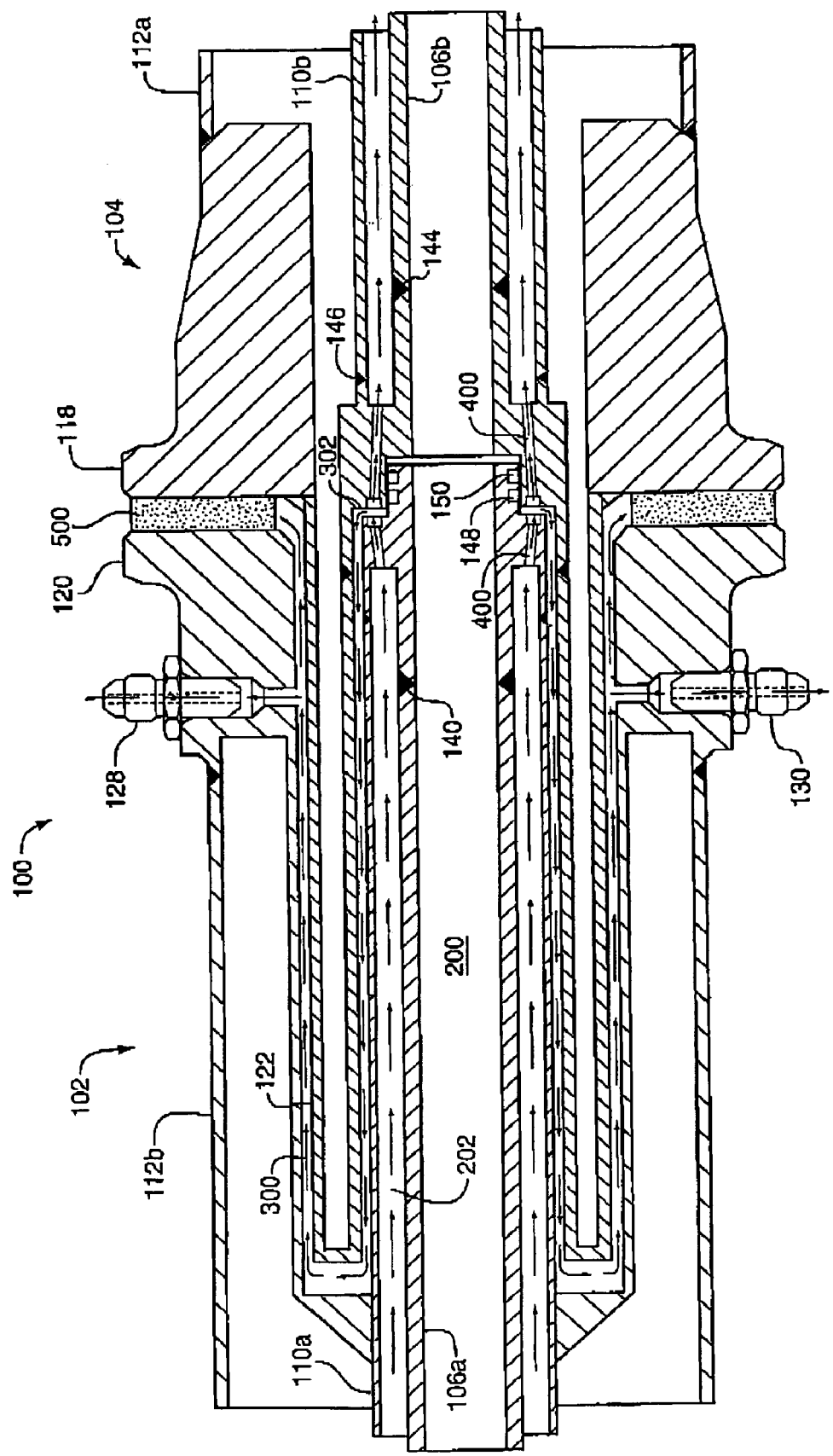
FIG. 3 is an enlarged cross-sectional view of the coupler of FIG. 1, illustrating an internal vapor shielding flow path.

Referring to FIGS. 1–3, there is shown one embodiment of a bayonet coupler 100. The coupler 100 is designed to form a detachable bayonet connection between a pair of conduit sections 106a and 106b. In this regard, each of the conduit sections 106a and 106b define a flow path 152 and 154 respectively, which are fluidly connected when the coupler 100 is connected, as shown in FIG. 3, to form a flow path 200. Preferably, the conduit sections 106a and 106b are constructed from a suitable material, e.g., stainless steel, designed to transport high-pressure, low temperature cryogenic fluids such as liquid helium and/or liquid nitrogen. It should be noted, however, that although the coupler 100 provides specific advantages when utilized to connect high-pressure flow path sections, such as provided by conduit sections 106a and 106b, the coupler 100 may be utilized to connect any two conduit sections, e.g., pipe, in a detachable manner. Thus, it will be appreciated, that the coupler 100 may be utilized in numerous other applications, as a matter of design choice, where a detachable connection of two conduit sections is desired/required.

The coupler 100 generally includes a male member 104 and a female member 102 that collectively form what may be referred to as a bayonet connection. The male member 104 includes a hub 118. Where the coupler 100 is used for connection of cryogenic flow paths, the male member 104 may also include a vacuum conduit 112a connected in an axial relationship to the hub 118 by any suitable means, such as a welded connection at the joint 114. Similarly, the female member 102 includes a hub 120. As with the male member 104, where the coupler 100 is used for connection of cryogenic flow paths, the female member 104 may also include a vacuum conduit 112b connected to the hub 120 in an axial relationship by any suitable means, such as a welded connection at the joint 116. The vacuum conduits, 112a and 112b, may consist of an outer shell or pipe. In some examples of the coupler 100, the vacuum conduits 112a and 112b may also house jacketed radiation shielding, such as aluminized Kapton® or aluminized Mylar, separated by a paper or scrim material, as conventionally done in the art, to form a hard vacuum insulator.

To form the bayonet connection, the male hub 118 includes a male bayonet extension 122 that is in the form of an elongated annular member connected to the hub 118. To form the other half of the bayonet connection, the female hub 120 includes a mating annular aperture 124 designed to receive the male bayonet extension 122 in a bayonet connection when the hubs 118 and 120 are connected as shown in FIG. 3. The male bayonet extension 122 may be constructed from any suitable material, as a matter of design choice and desired application of the coupler 100, e.g., high or low-pressure material flow through the flow path 200. Where the coupler 100 is utilized to connect high-pressure cryogenic conduit sections, such as 106a and 106b, the male bayonet extension 122 may be constructed from an alloy material, such as Inconel® 718. In the case of temperature sensitive material flows, e.g., cryogenic material flow, the bayonet extension 122 preferably includes a hollow core 156 to increase the conductive path length along extension 122 for heat conduction and provide better insulation of the flow path 200.

To reduce heat transfer to the flow path 200, while providing a significantly shortened overlapping portion in a bayonet connection, e.g., on the order of inches, the coupler 100 includes a second pair of conduit sections 110a and 110b that are fluidly interconnectable. The coupler 100 connects the conduit sections 110a and 110b such that they define a second flow path 202 around the flow path 200. That is, the flow path 200 and flow path 202 are coaxial or concentrically disposed. The conduit sections 110a and 110b are connected between the respective hubs 118 and 120, and the conduit sections 106a and 106b via a conventional connection such as welds, 140, 142, 144, and 146. In this characterization, the flow path 202 is designed to transport a liquid or gas that is at the same temperature as the material transferred in the flow path 200. In this manner, the flow path 202 provides an insulating vapor shield around the flow path 200. Furthermore, as will become apparent from the following description, the flow path 202 also provides a source of insulating vapor shield for the coupler 100.

The vapor shielding material utilized in the flow path 202 may be any material maintainable at the same temperature as the material within the flow path 200. In one example according to the present invention, the vapor shielding material may be the same material transported within the flow path 200. Preferably, in this regard, while the vapor shielding material in the flow path 202 is the same material at the same temperature as the material in the flow path 200, it is flowed through the flow path 202 at a substantially lower pressure. In other words, the amount of flow, or flow rate, within the vapor shielding flow path 202 may be substantially less than that of the material within the flow path 200, since it is primarily utilized to insulate the material transported in the flow path 200. For instance, in one example of the illustrated fluid system, the pressure of the material flow within the flow path 200 may be on the order of 5500 PSI while the pressure of the material flow in the flow path 202 may be on the order of 50 PSI. Advantageously, where material at substantially lower pressure is utilized as an insulator in the flow path 202, the thickness of the extension 122 may be significantly reduced, as the separation force is less. In other words, because the pressure in the flow path 202 is relatively low, there is less pressure on the coupler 100 thereby reducing the required thickness of the extension 122. This in turn leads to the further advantage of reduced heat conduction through the coupler 100 from the environment as the thinner walls of the extension 122 conduct less heat, which in turn reduces the required length of the bayonet extension 122.

To further reduce heat transfer from the environment through the coupler 100, the coupler 100 is designed to define a third flow path 300, exemplified in FIG. 3, when the male and female hubs 118 and 120 are coupled. The third flow path 300 is fluidly connected to the flow path 202 so that at least a portion of the vapor shielding material from the flow path 202 is channeled through the coupler 100 to provide a vapor shield within the coupler 100. Such vapor shielding within the coupler 100, reduces heat transfer through the coupler 100 from the atmosphere, thereby permitting construction of a significantly smaller, e.g., on the order of inches, bayonet coupler 100 for high-pressure applications.

According to this characterization, the flow path 300 comprises a small annular space defined between the male bayonet extension 122 and the wall of the mating aperture 124, such that the flow path 300 circumscribes the male bayonet extension 122. In this regard, the coupler 100 further includes at least one and more preferably two bypass flow valves, 128 and 130, that provide an adjustable vent to the outside atmosphere for the material flowing within the flow path 300. It should be noted, however, that any number of bypass flow valves could be utilized as a matter of design choice. As will be appreciated, the continuous flow and venting of the vapor shielding material through the flow path 300 effectively intercepts and carries heat traveling inward along the path 158 back to the outside atmosphere.

Figure 4:
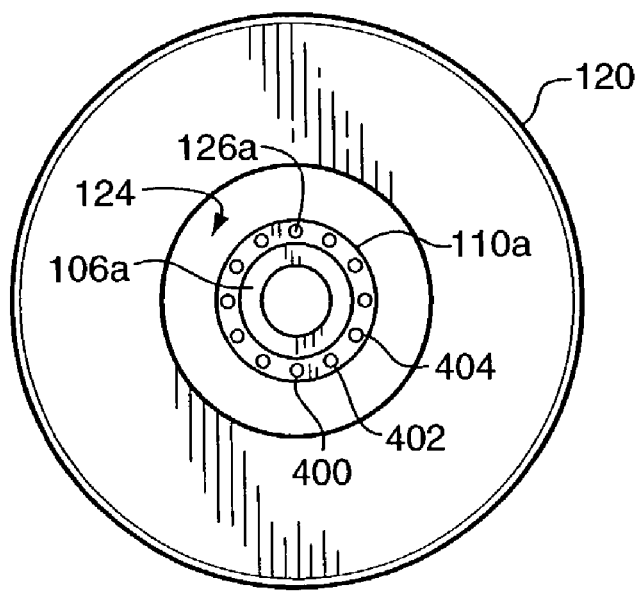
FIG. 4 illustrates an end view of a hub for the coupler of FIG. 1 and connected flow paths.

According to the above characterization, the flow path 300 originates at the junction of the conduit sections 110a and 110b. In this regard, a male adapter 160 may be provided, such as by welding, on the end of the conduit sections 106a and 110a. Similarly, a female adapter 162 may be provided, such as by welding, on the end of the conduit sections 106b and 110b to form a connection between the respective conduit sections 106a–b and 110a–b. Further, in this regard, with reference to FIG. 4, the ends 126a and 126b of the adapters 160 and 162 may include a plurality of apertures as exemplified by apertures 400–404. Such apertures 400–404 are provided in the adapters 160 and 162 to fluidly connect the conduit sections 110a and 110b. In other words, apertures 400–404 permit material flow between ends 126a and 126b when the coupler 100 couples the conduit sections 110a and 110b. It should be noted in this regard, that when the coupler 100 is coupled, to ends 126a and 126b may not be adjacently disposed, but rather a small space 302 may be defined therebetween. This permits the vapor shielding material to flow into the flow path 300 as well as continue in the flow path 202. In this regard, once in the flow path 300 the vapor shielding material travels through the annular space around the male bayonet extension 122 where it is vented to the atmosphere through bypass valves, 128 and 130.

Such flow of the vapor shielding material in the flow path 300 provides the advantage of isolating the high-pressure material within the flow path 200 from heat conduction through the coupler 100. In other words, the flow path 300 operates to channel the vapor shielding material from the flow path 202 around the coupler 100 such that the coolant, which is vented to the atmosphere, intercepts heat entering the coupler 100 along path 158. As mentioned above, this provides for a smaller coupler that is operational with high-pressure connections.

Those skilled in the art will appreciate that different size couplers may be constructed according to the principles of the present invention by varying three variables, namely the thickness of the extension 122, the pressure of the vapor shielding material through the flow path 202, and the length of the extension 122. In this regard, in one example of the coupler 100 that is designed for coupling high-pressure cryogenic flow paths carrying for example, helium at pressures in the range of 300–5000 PSI, the length of the male bayonet extension 122 may be in the range of about 4 to about 12 inches, and preferably is on the order of about 6 inches, while the pressure of the vapor shielding material is about 50 PSI. As noted above, however, the length of the extension 122 may be further reduced by increasing the pressure or flow rate of the vapor shielding material in the path 202.

Alternatively, it should be noted that where it is undesirable to vent the vapor shielding material to the atmosphere, the valves 128 and 130 may be connected to an external cooling system, e.g., coil tubing around the vacuum conduit 112a–b, to provide additional cooling.

Figure 5:
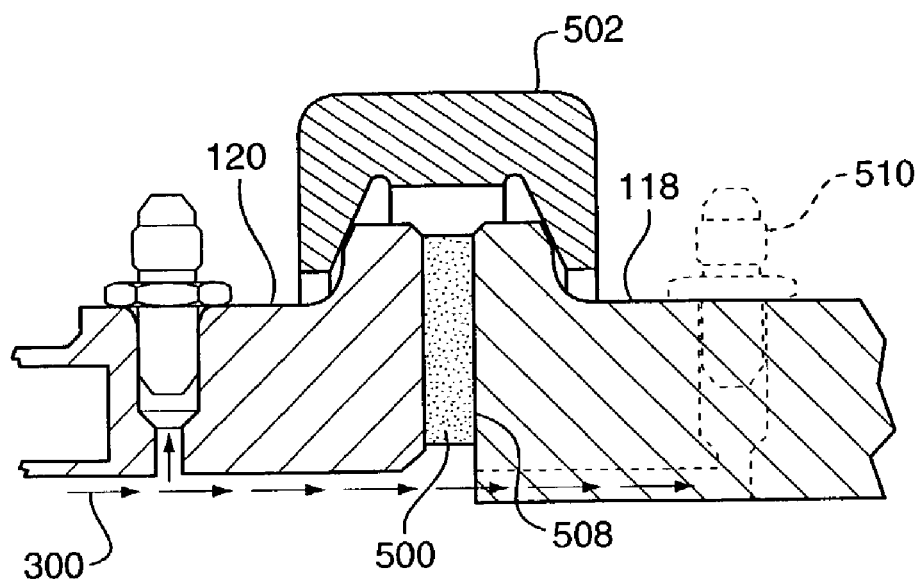
FIG. 5 illustrates a partial perspective view of one embodiment for interconnecting the pair of hubs for the coupler of FIG. 1.

Referring to FIG. 5, a seal ring 500 may also be disposed between adjacent faces of the hubs 118 and 120. The seal ring 500, in turn, provides a seal for the low-pressure vapor shielding material in the flow path 300. The seal ring 500 is held in position by the hubs 118 and 120, thereby creating an area of sealing surface with the inner surface of the hubs 118 and 120 to seal the low-pressure vapor shielding within the flow path 300. It should be noted that in an alternative design the flow path 300 may be extended beyond the seal ring 500 and vented via a valve 510 included in the hub 118 as indicated by the dashed lines of FIG. 5. Extending the flow path 300 past the valves 128 and 130, to the a valve 510 included in the hub 118, provides the advantage of intercepting heat conducted through the seal ring 500 and venting it to the atmosphere.

Figure 6:
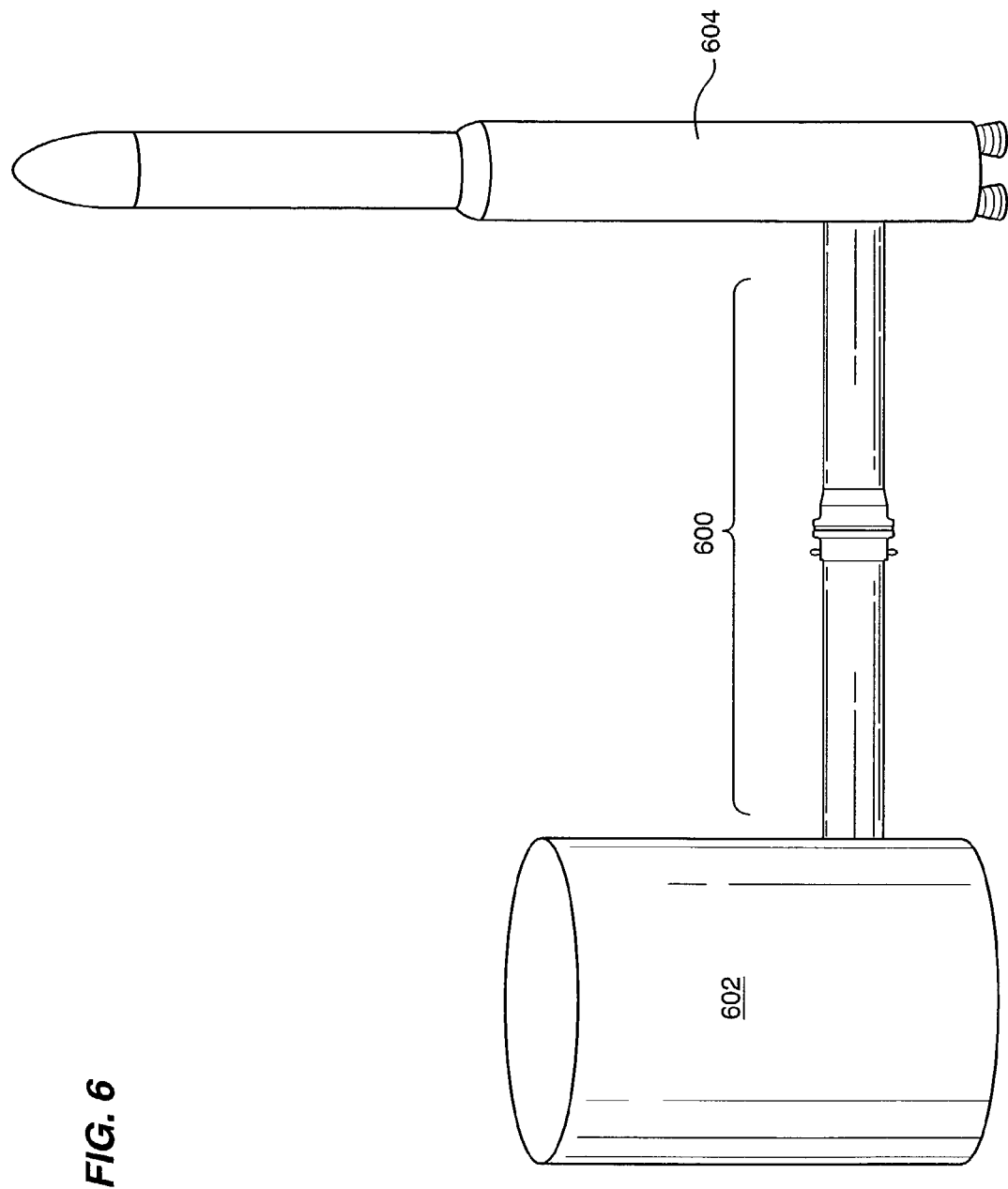
FIG. 6 illustrates an example of an operational protocol for the coupler of FIG. 1.

Referring to FIG. 6, one example of an application of the coupler 100 is use in the aerospace industry to provide a detachable connection for a high-pressure cryogenic transfer line 600. For instance, the coupler 100 is ideal for connecting a ground system 602, e.g., terrestrial cryogenic storage system, to cryogenic storage vessels on a space vehicle 604 prior to launch. In this regard, cryogenic fluids utilized in the space industry are commonly maintained at extremely high pressures, up to 5000 PSI, that must be transferred from a terrestrial based system 602 to a space vehicle 604 for use during the launch and flight into space.

Operationally, the coupler 100 may be used to connect two conduit sections, e.g., 106a and 106b, of a cryogenic material transfer system. In this regard, inserting the male bayonet extension 122 into the female aperture 124 until the hubs 118 and 120 are adjacent each other connects the hubs, 118 and 120. This in turn connects the conduit sections 106a and 106b via a connection apparatus disposed on the male adapter 160. The connection apparatus may be any suitable connection apparatus appropriate for connecting high-pressure conduit sections 106a and 106b. For instance in one example, the connection apparatus may be redundant spring energized seals, 148 and 150, installed in the adapter 160 of the conduit section 106a. The spring energized seals, 148 and 150, mate with a machined female counterpart on the female adapter 162 of the flow path section 106b as conventionally done in the art. In this regard, while multiple spring-energized seals, 148 and 150, are illustrated, as redundancy is an important aspect in systems utilized in the aerospace industry, a single spring energized seal, e.g., 148, may be utilized as a matter of design choice.

Following insertion of the male bayonet extension 122 in the aperture 124, a clamp 502 may also be provided to secure the two hubs 118 and 120 together as illustrated in FIG. 5. Once the hubs 118 and 120 are clamped and the connection made between the conduit sections 106a and 106b, it is desirable to start the flow in the low-pressure flow path 202 prior to the flow in the high-pressure flow path 200. This provides the advantage of cooling the system e.g., intercepting heat and cooling the exterior surface of the conduit sections 106a and 106b, prior to beginning the flow in the path 200. This in turn also starts the flow in the flow path 300 around the bayonet joint of the coupler 100 to intercept and remove heat therein, e.g., through venting at bypass valves 128 and 130, prior to transferring material through the high-pressure flow path 200. Subsequent to system cooling, e.g., starting flow of the vapor shielding material through the flow paths, 202 and 300, the high-pressure material flow through the flow path 200 begins.

As mentioned above, the vapor shielding material in the flow path 202 may be the same type of material transferred through the high-pressure flow path 200. The vapor shielding material, however, is preferably at a much lower pressure than that of the material in the flow path 200, such that it is easily ventable through the valves 128 and 130. In other words if the material to be transferred is a cryogenic material such as helium, then low-pressure helium, at the same temperature, may be utilized as the vapor shielding material.

Those skilled in the art will appreciate numerous advantages provided by the present coupler 100. For instance, leakage of cryogenic material is significantly reduced as the temperature around the joint between the conduit sections 106a and 106b, is equalized prior to starting the high-pressure material flow. This in turn operates to reduce expansion and contraction of the joint resulting from heat conduction from the environment. Further, in this regard, any resulting leakage from the joint between the conduit sections 106a and 106b enters the flow path 300 and is utilized as vapor shielding material. This is especially advantageous where the same material at the same temperature, only a lower pressure, is utilized in the flow path 202 as the vapor shielding material.

Those skilled in the art will appreciate variations of the above-described embodiments that fall within the scope of the invention. As a result, the invention is not limited to the specific examples and illustrations discussed above, but only by the following claims and their equivalents.

We claim:

1. A coupler for detachably connecting first and second material flow path sections, the coupler comprising:
 a male hub member connected to the first material flow path section and comprising an annular male bayonet extension;
 a female hub member connected to the second material flow path section and comprising an annular aperture, wherein the male bayonet extension extends within the annular aperture; and
 a vapor shielding flow path internally defined within the coupler and comprising an open space between the female hub member and the entirety of the male extension member that is disposed in the annular aperture, wherein no portion of the male bayonet extension contacts the female hub member within the annular aperture, and wherein the vapor shielding flow path extends along an inner wall of said bayonet extension within said annular aperture, around an end of said bayonet extension within said annular aperture in order to provide a vapor shield within the coupler to reduce heat transfer through the coupler from the atmosphere.

2. The coupler of claim 1, wherein the male and female hub members form a bayonet connection between the first and second material flow path sections.

3. The coupler of claim 1, further comprising:
 at least one valve fluidly interconnected to the vapor shielding flow path to controllably discharge vapor shielding material external to the coupler.

4. The coupler of claim 1, further comprising:
 a sealing member disposed between the male and female hub members.

5. The coupler of claim 1, wherein the vapor shielding flow path comprises:
 a first portion that extends along an inner wall of the male bayonet extension within the annular aperture, around a second portion that goes around an end of the male bayonet extension within the annular aperture, and a third portion that extends along an outer wall of the male bayonet extension within the annular aperture.

6. The coupler of claim 1, further comprising:
 a first conduit disposed around the first material flow path section, wherein the first conduit is connected to the male hub member and fluidly interconnected to the vapor shielding flow path; and
 a second conduit disposed around the second material flow path section, wherein the second conduit is connected to the female hub member and fluidly interconnected to the vapor shielding flow path and the first conduit.

7. The coupler of claim 1, wherein the first and second material flow path sections accommodate a low pressure material flow.

8. A fluid system, comprising:
 a first conduit;
 a second conduit disposed about the first conduit;
 a female connector associated with the first and second conduits and comprising an annular aperture;
 a third conduit;
 a fourth conduit disposed about the third conduit;
 a male connector associated with the third and fourth conduits and comprising a male bayonet extension, wherein the male bayonet extension extends within the annular aperture of the female connector, wherein the first and third conduits are fluidly connected to define a first flow path, and wherein the second and fourth conduits are fluidly connected to define a second flow path; and
 a bayonet extension flow path that extends along an inner wall of the male bayonet extension within the annular aperture, around an end of the male bayonet extension within the annular aperture, and along an outer wall of the male bayonet extension within the annular aperture, wherein the bayonet extension flow path is fluidly connected with a flow through the second flow path.

9. A fluid system, as claimed in claim 8, wherein:
a flow path through the second conduit is defined by an annular space between the first and second conduits, and wherein a flow path through the fourth conduit is defined by a space between the third and fourth conduits.

10. A fluid system, as claimed in claim 8, further comprising:
a first adapter attached to a first end of each of the first and second conduits and comprising third and fourth flow paths, wherein the third flow path is fluidly connected with the first conduit, and wherein the fourth flow path is fluidly connected with a space between the first and second conduits; and
a second adapter attached to a first end of each of the third and fourth conduits and comprising fifth and sixth flow paths, wherein the fifth flow path is fluidly connected with the third conduit, and wherein the sixth flow path is fluidly connected with a space between the third and fourth conduits.

11. A fluid system, as claimed in claim 10, wherein:
the male connector extends from the second adapter, wherein a first portion of the first adapter interfaces with a first portion of the second adapter, wherein a second portion of the first adapter having an end of the fourth flow path is separated from a second portion of the second adapter having an end of the sixth flow path by a second space, wherein the second space intersects with the bayonet extension flow path.

12. A fluid system, as claimed in claim 8, further comprising:
at least one vent valve fluidly interconnected with the bayonet extension flow path and that discharges exteriorly of said fluid system, wherein each said vent valve is mounted on any of the female connector and the male connector.

13. A method for connecting first and second conduits of a cryogenic fluid system, wherein a male connector is interconnected with said first conduit and wherein a female connector is interconnected with said second conduit, wherein said male connector comprises an annular bayonet extension on one end of said male connector, and wherein said female connector comprises an annular aperture on one end of said female connector, said method comprising the steps of:
directing said bayonet extension of said male connector into said annular aperture of said female connector;
providing a first flow through said first and second conduits after said directing step; and
directing a second flow along an inner wall of said bayonet extension within said annular aperture, around an end of said bayonet extension within said annular aperture, and along an outer wall of said bayonet extension within said annular aperture.

14. The method of claim 13, further comprising the step of venting said second flow to an outside atmosphere.

15. The method of claim 13, wherein said first flow is at a low pressure.

16. The method of claim 13, wherein said directing a second flow step comprises using only a portion of said first flow.

17. A method for connecting first, second, third, and fourth conduits, wherein said second conduit is concentrically disposed about said first conduit, wherein said fourth conduit is concentrically disposed about said third conduit, wherein a male connector is associated with said first and second conduits, wherein a female connector is associated with said third and fourth conduits, wherein said male connector comprises an annular bayonet extension on one end of said male connector, and wherein said female connector comprises an annular aperture on one end of said female connector, said method comprising:
directing said bayonet extension of said male connector into said annular aperture of said female connector;
executing a first fluidly interconnecting step comprising fluidly interconnecting said first and third conduits using said directing step;
executing a second fluidly interconnecting step comprising fluidly interconnecting said second and fourth conduits using said directing step;
providing a first flow through said first and third conduits after said first fluidly interconnecting step;
providing a second flow through said second and fourth conduits after said second fluidly interconnecting step; and
directing a third flow along an inner wall of said bayonet extension within said annular aperture, around an end of said bayonet extension within said annular aperture, and along an outer wall of said bayonet extension within said annular aperture.

18. The method of claim 17, wherein said directing a third flow step uses only a portion of said second flow.

19. The method of claim 17, further comprising the step of venting said third flow to an outside atmosphere.

20. The method of claim 17, wherein said second flow is at a pressure that is substantially less than a pressure of said first flow.

21. The method of claim 20, wherein said first and second flows are of a common material.

22. A method for transporting a cryogenic fluid, comprising the steps of:
attaching a first coupling to a first conduit;
attaching a second coupling to a second conduit;
interconnecting the first and second couplings, wherein the interconnecting step comprises defining first and second flow paths, wherein the first flow path comprises the first and second conduits;
providing a first flow through the first flow path; and
directing only a portion of the first flow into the second flow path while a remainder of the first flow continues along the first flow path.

23. A method, as claimed in claim 22, wherein:
the defining a second flow path step comprises providing a space between the first and second couplings after the interconnecting step.

24. A method, as claimed in claim 23, wherein:
the first coupling comprises an annular recess, wherein the second coupling comprises an extension that is disposed within the annular recess via the interconnecting step, and wherein the second flow path comprises a space between the extension of the second coupling and a portion of the first coupling defining the annular recess.

25. A method, as claimed in claim 23, wherein:
the directing step comprises cooling at least the first coupling.

26. A method, as claimed in claim 23, further comprising the step of:
directing the portion of the first flow through at least one bypass valve.

27. A method, as claimed in claim 23, further comprising the step of:

venting the portion of the first flow externally of the first coupling.

28. A cryogenic fluid system, comprising:

first and second conduits, wherein said first conduit is disposed within said second conduit;

a male connector associated with said first and second conduits;

third and fourth conduits, wherein said third conduit is disposed within said fourth conduit;

a female connector associated with said third and fourth conduits, wherein said male connector and said female connector are detachably interconnected to define a coupler, to fluidly connect said first and third conduits to define a first flow path, and to fluidly interconnect said second and fourth conduits to define a second flow path, wherein said second flow path is disposed about said first flow path;

a first fluid within said first flow path; and a second fluid within said second flow path, wherein said coupler comprises an internal flow path that is fluidly interconnected with said second flow path, wherein only a portion of a flow through said second flow path is directed into said internal flow path.

29. A fluid system, as claimed in claim 28, wherein:

a pressure of said first fluid within said first flow path is different from a pressure of said second fluid within said second flow path.

30. A fluid system, as claimed in claim 28, wherein:

a pressure of said second fluid within said second flow path is less than a pressure of said first fluid within said first flow path.

31. A fluid system, as claimed in claim 28, wherein:

a pressure of said second fluid within said second flow path is substantially less than a pressure of said first fluid within said first flow path.

32. A fluid system, as claimed in claim 31, wherein:

said first and second fluids are the same material.

33. A fluid system, as claimed in claim 28, wherein:

said female connector comprises an annular aperture, wherein said male connector comprises a male bayonet extension, wherein said male bayonet extension extends within said annular aperture of said female connector, wherein said internal flow path of said coupler extends along an inner wall of said male bayonet extension within said annular aperture, around an end of said male bayonet extension within said annular aperture, and along an outer wall of said male bayonet extension within said annular aperture.

34. A fluid system, as claimed in claim 28, wherein:

said internal flow path interconnects said second flow path with an exterior of said coupler.

35. A fluid system, as claimed in claim 28, further comprising:

at least one vent valve fluidly interconnected with said internal flow path and that discharges exteriorly of said fluid system, wherein each said vent valve is mounted on any of said female connector and the male connector.

* * * * *